US011988256B2

(12) United States Patent
Jing et al.

(10) Patent No.: US 11,988,256 B2
(45) Date of Patent: May 21, 2024

(54) CLUTCH CONTROL METHOD AND APPARATUS, STORAGE MEDIUM, AND PROGRAM PRODUCT (71) Applicants: Zhejiang Geely Holding Group Co., LTD, Zhejiang (CN); Ningbo Geely Royal Engine Components Co., Ltd., Zhejiang (CN); Aurobay Technology Co.,Ltd., Zhejiang (CN)

(72) Inventors: Junchao Jing, Zhejiang (CN); Jun Yang, Zhejiang (CN); Yiqiang Liu, Zhejiang (CN); Yiming Hui, Zhejiang (CN); Guang Ban, Zhejiang (CN); Guikang Yang, Zhejiang (CN); Weishan Huang, Zhejiang (CN); Ingo Scholten, Zhejiang (CN); Ruiping Wang, Zhejiang (CN)

(73) Assignees: Zhejiang Geely Holding Group Co., LTD, Zhejiang (CN); Ningbo Geely Royal Engine Components Co., Ltd., Zhejiang (CN); Aurobay Technology Co.,Ltd., Zhejiang (CN)

( * ) Notice: Subject to any disclaimer, the term of this patent is extended or adjusted under 35 U.S.C. 154(b) by 0 days.

(21) Appl. No.: 18/462,440

(22) Filed: Sep. 7, 2023

(65) Prior Publication Data
US 2023/0417296 A1 Dec. 28, 2023

Related U.S. Application Data (63) Continuation of application No. PCT/CN2022/103465, filed on Jul. 1, 2022.

(30) Foreign Application Priority Data

Dec. 31, 2021 (CN) .......................... 202111668160.X (51) Int. Cl.
F16D 48/06 (2006.01)

(52) U.S. Cl.
CPC .... F16D 48/06 (2013.01); F16D 2500/30406 (2013.01); F16D 2500/30412 (2013.01);
(Continued)

(58) Field of Classification Search
CPC ........... F16D 48/06; F16D 2500/30406; F16D 2500/30412; F16D 2500/30425;
(Continued)

(56) References Cited

U.S. PATENT DOCUMENTS

2003/0110875 A1* 6/2003 Brandt .................. B60W 10/10
74/335
2009/0090591 A1 4/2009 Petzold et al.
(Continued)

FOREIGN PATENT DOCUMENTS

CN 103322163 9/2013
CN 103453039 12/2013
(Continued)

OTHER PUBLICATIONS

"International Search Report (Form PCT/ISA/210) of PCT/CN2022/103465," mailed on Sep. 29, 2022, with English translation thereof, pp. 1-6.
(Continued)

Primary Examiner — Edwin A Young
(74) Attorney, Agent, or Firm — JCIPRNET (57) ABSTRACT A clutch control method, including: determining whether a current vehicle state satisfies a condition for a clutch to enter a sliding friction state; if so, controlling the clutch to enter the sliding friction state, and determining a target sliding friction rotating speed of the clutch; determining whether the current vehicle state satisfies a condition for entering a clutch torque deviation collecting state; if so, collecting a
(Continued)

torque deviation once and storing the torque deviation; at an end of an adjustment period, accumulating all torque deviations collected previously and taking an average value according to an accumulation number of times, so as to obtain an average torque deviation; if the average torque deviation exceeds a preset deviation threshold, recording the average torque deviation; and if the current vehicle state satisfies a condition for entering a deviation applying state, adjusting a current clutch friction coefficient according to the recorded average torque deviation.

20 Claims, 4 Drawing Sheets

(52) U.S. Cl.
CPC .............. *F16D 2500/30425* (2013.01); *F16D 2500/30428* (2013.01); *F16D 2500/3056* (2013.01); *F16D 2500/31446* (2013.01)

(58) Field of Classification Search
CPC ... F16D 2500/30428; F16D 2500/3056; F16D 2500/31446
See application file for complete search history.

(56) References Cited

U.S. PATENT DOCUMENTS

2011/0004380 A1\* 1/2011 Kojima ................ F16D 48/066
701/53

2018/0118212 A1 5/2018 McDonnell et al.
2020/0331450 A1\* 10/2020 Jonuscheit .......... B60W 10/023

FOREIGN PATENT DOCUMENTS

| | | |
|---|---|---|
| CN | 103486241 | 1/2014 |
| CN | 105822761 | 8/2016 |
| CN | 106641024 | 5/2017 |
| CN | 106763285 | 5/2017 |
| CN | 109404437 | 3/2019 |
| CN | 110651134 | 1/2020 |
| CN | 110816536 | 2/2020 |
| CN | 111677783 | 9/2020 |
| CN | 112943822 | 6/2021 |
| CN | 113236682 | 8/2021 |
| CN | 113586621 | 11/2021 |
| CN | 113586623 | 11/2021 |
| CN | 114321216 | 4/2022 |
| DE | 102019209598 | 1/2021 |
| EP | 1375238 | 1/2004 |
| WO | 2017025087 | 2/2017 |

OTHER PUBLICATIONS

"Written Opinion of the International Searching Authority (Form PCT/ISA/237) of PCT/ CN2022/103465," mailed on Sep. 29, 2022, with English translation thereof, pp. 1-6.
"Office Action of China Counterpart Application", issued on Sep. 29, 2023, with partial English translation thereof, p. 1-p. 7.

\* cited by examiner

CLUTCH CONTROL METHOD AND APPARATUS, STORAGE MEDIUM, AND PROGRAM PRODUCT

CROSS-REFERENCE TO RELATED APPLICATION

The present application is a continuation of International Application No. PCT/CN2022/103465, filed on Jul. 1, 2022, which claims priority to Chinese Patent Application No. 202111668160.X, which was filed with China National Intellectual Property Administration on Dec. 31, 2021 and titled "CLUTCH CONTROL METHOD AND APPARATUS, STORAGE MEDIUM, AND PROGRAM PRODUCT". The disclosures of the above two applications are incorporated herein by reference in their entireties.

BACKGROUND

Technical Field

The present application relates to the technical field of vehicle intelligent control, and in particular, to a clutch control method and apparatus, a storage medium and a program product.

Description of Related Art

With the increasing intelligence of vehicles, vehicles have gradually developed from ordinary transportation means to one of the important places in people's daily life.

In vehicles equipped with automatic mechanical transmission (AMT)/dual clutch automatic transmission (DCT)/dedicated hybrid transmission (DHT), the control effect of the clutch has a great influence on the power, economy and smoothness of the vehicle. In order to achieve good clutch control, accurate calculation of the friction torque transmitted by the clutch is essential. In order to achieve accurate friction torque for the clutch, it is an important factor to determine the friction coefficient of the clutch friction disc and its counterpart.

However, since the clutch friction coefficient is affected by many factors, the clutch friction coefficient is not a fixed value. The clutch friction coefficient reflects the relationship between the clutch torque and the pressure, so the automatic adjustment of the clutch friction coefficient plays an important role in the accurate control of the clutch torque.

SUMMARY

The present application provides a clutch control method and apparatus, a storage medium and a program product, so as to realize automatic adjustment of the clutch friction coefficient, and thereby realizing accurate control of the clutch torque.

In a first aspect, the present application provides a clutch control method, including:
  receiving an activation signal to complete initialization, entering an adjustment period, and entering a waiting state;
  determining whether a current vehicle state satisfies a condition for a clutch to enter a sliding friction state in the waiting state;
  if the condition for the clutch to enter the sliding friction state is satisfied, controlling the clutch to enter the sliding friction state, and determining a target sliding friction rotating speed, corresponding to a current gear position, of the clutch;
  determining whether a condition for entering a clutch torque deviation collecting state is satisfied, according to a relationship between an actual sliding friction rotating speed of the clutch and the target sliding friction rotating speed, and the current vehicle state;
  if the condition for entering the clutch torque deviation collecting state is satisfied, entering the clutch torque deviation collecting state, collecting a torque deviation once, and storing the torque deviation;
  at an end of the adjustment period, accumulating all torque deviations collected previously and then taking an average value according to an accumulation number of times, so as to obtain an average torque deviation; and if the average torque deviation exceeds a preset deviation threshold, recording the average torque deviation;
  determining whether the current vehicle state satisfies a condition for entering a deviation applying state; and
  if the current vehicle state satisfies the condition for entering the deviation applying state, adjusting a current clutch friction coefficient according to the recorded average torque deviation.

In one or more embodiments of the present application, it is determined that the condition for the clutch to enter the sliding friction state is satisfied if the current vehicle state satisfies following conditions: the actual sliding friction rotating speed of the clutch is within a preset rotating speed range, and an acceleration speed of the actual sliding friction rotating speed is within a preset acceleration speed range; and a vehicle satisfies a basic preset condition.

In one or more embodiments of the present application, it is determined that the condition for the clutch to enter the sliding friction state is satisfied if the current vehicle state further satisfies following conditions: a number of times of an invalid sliding friction of the clutch is less than a preset number of times limit, where the invalid sliding friction refers to a sliding friction duration exceeding a preset duration threshold; an absolute value of a second differential of an output shaft rotating speed is less than a threshold; an adjustment period interval duration is within a preset duration; and an actual sliding friction duration of the clutch does not exceed a preset duration threshold.

In one or more embodiments of the present application, the determining whether the condition for entering the clutch torque deviation collecting state is satisfied, according to the relationship between the actual sliding friction rotating speed of the clutch and the target sliding friction rotating speed, and the current vehicle state includes: determining that the condition for entering the clutch torque deviation collecting state is satisfied if the relationship between the actual sliding friction rotating speed of the clutch and the target sliding friction rotating speed, and the current vehicle state satisfy following conditions: the actual sliding friction rotating speed of the clutch is within a range of the target sliding friction rotating speed; the acceleration speed of the actual sliding friction rotating speed of the clutch is within a preset acceleration speed range; when entering the clutch torque deviation collecting state in a previous adjustment period, a number of times of collecting torque deviation is less than a preset number of times limit; and a vehicle satisfies a basic preset condition.

In one or more embodiments of the present application, where the vehicle satisfies the basic preset condition includes: the clutch is not in a gear position shifting process;

the clutch is in an in-gear state; a current mode of a vehicle is consistent with a requested mode; the clutch does not overheat; a current gear position of the vehicle is consistent with a requested gear position; and when a mode switching clutch requests sliding friction, a gear position shifting clutch does not allow sliding friction; when the gear position shifting clutch requests sliding friction, the mode switching clutch does not allow sliding friction.

In one or more embodiments of the present application, where the vehicle satisfies the basic preset condition further including: an oil temperature of the clutch is within a preset temperature range; an opening degree of an accelerator pedal of the vehicle is within a preset opening range; a change rate of the accelerator pedal of the vehicle is within a preset pedal change rate range; an output shaft rotating speed of the clutch is within a preset rotating speed range; a change rate of the output shaft rotating speed of the clutch is within a preset rotating speed change rate range; an input shaft torque of the clutch is within a preset input shaft torque range; and an input shaft torque slope of the clutch is within a preset input shaft torque slope range.

In one or more embodiments of the present application, where the determining whether the current vehicle state satisfies the condition for entering the deviation applying state includes: determining to enter the deviation applying state if the current vehicle state satisfies following conditions: the clutch is not in a neutral state; and when entering the clutch torque deviation collecting state in a present adjustment period, the number of times of collecting torque deviation is greater than a preset number of times limit.

In one or more embodiments of the present application, if the current vehicle state satisfies the condition for entering the deviation applying state, after the adjusting the current clutch friction coefficient according to the recorded average torque deviation, further including: entering a clearing state to clear all torque deviation data collected in the present adjustment period.

In one or more embodiments of the present application, the entering the clutch torque deviation collecting state and collecting the torque deviation once includes: obtaining the torque deviation by substituting a clutch proportional-integral (PI) torque, a hysteresis torque and an input shaft torque into the following formula: torque deviation=(clutch PI torque+hysteresis torque)/input shaft torque; where the clutch PI torque is a negative value, and the hysteresis torque refers to an exceeding value of a corresponding torque when the input shaft torque descends compared with a corresponding torque when the input shaft torque ascends at the same request pressure point; the input shaft torque is an input shaft torque of the clutch.

In one or more embodiments of the present application, where the clutch PI torque=clutch sliding friction P-term torque+clutch sliding friction I-term torque; where the clutch sliding friction P-term torque=(target sliding difference−actual sliding difference)*P-term coefficient; clutch sliding friction I-term torque=(target sliding difference−actual sliding difference)*cumulative sum of I-term coefficients.

In one or more embodiments of the present application, the adjusting the current clutch friction coefficient according to the recorded average torque deviation includes: determining a total deviation according to the average torque deviation and a previous deviation; if the total deviation is a negative value, adjusting and reducing the clutch friction coefficient according to a preset conversion coefficient; and if the total deviation is a positive value, adjusting and increasing the clutch friction coefficient according to the preset conversion coefficient.

In one or more embodiments of the present application, the total deviation is limited by a maximum value and a minimum value, and the maximum value and the minimum value are −30% and 30% respectively.

In a second aspect, the present application provides a clutch control apparatus, including:
- an activation waiting module, configured to receive an activation signal to complete initialization, enter an adjustment period, and enter a waiting state;
- a first determining module, configured to determine whether a current vehicle state satisfies a condition for a clutch to enter a sliding friction state in the waiting state;
- a sliding friction processing module, configured to control the clutch to enter the sliding friction state if the condition for the clutch to enter the sliding friction state is satisfied, and determine a target sliding friction rotating speed, corresponding to a current gear position, of the clutch;
- a second determining module, configured to determine whether a condition for entering a clutch torque deviation collecting state is satisfied, according to a relationship between an actual sliding friction rotating speed of the clutch and the target sliding friction rotating speed, and the current vehicle state;
- a deviation collecting module, configured to enter the clutch torque deviation collecting state if the condition for entering the clutch torque deviation collecting state is satisfied, collect a torque deviation once, and store the torque deviation;
- a deviation processing module, configured to accumulate all torque deviations collected previously at an end of the adjustment period and then take an average value according to an accumulation number of times, so as to obtain an average torque deviation; and if the average torque deviation exceeds a preset deviation threshold, record the average torque deviation;
- a third determining module, configured to determine whether the current vehicle state satisfies a condition for entering a deviation applying state; and
- a deviation applying module, configured to adjust a current clutch friction coefficient according to the recorded average torque deviation if the current vehicle state satisfies the condition for entering the deviation applying state.

In one or more embodiments of the present application, the first determining module is configured to determine that the condition for the clutch to enter the sliding friction state is satisfied if the current vehicle state satisfies following conditions: the actual sliding friction rotating speed of the clutch is within a preset rotating speed range, and an acceleration speed of the actual sliding friction rotating speed is within a preset acceleration speed range; a number of times of an invalid sliding friction of the clutch is less than a preset number of times limit, where the invalid sliding friction refers to a sliding friction duration exceeding a preset duration threshold; an absolute value of a second differential of an output shaft rotating speed is less than a threshold; an adjustment period interval duration is within a preset duration; an actual sliding friction duration of the clutch does not exceed a preset duration threshold; and a vehicle satisfies a basic preset condition.

In one or more embodiments of the present application, the second determining module is configured to determine that the condition for entering the clutch torque deviation collecting state is satisfied if the relationship between the actual sliding friction rotating speed of the clutch and the target sliding friction rotating speed, and the current vehicle state satisfy following conditions: the actual sliding friction rotating speed of the clutch is within a range of the target sliding friction rotating speed; the acceleration speed of the actual sliding friction rotating speed of the clutch is within a preset acceleration speed range; when entering the clutch torque deviation collecting state in a previous adjustment period, a number of times of collecting torque deviation is less than a preset number of times limit; and the vehicle satisfies the basic preset condition.

In one or more embodiments of the present application, the vehicle satisfies the basic preset condition including: the clutch is not in a gear position shifting process; the clutch is in an in-gear state; a current mode of a vehicle is consistent with a requested mode; the clutch does not overheat; a current gear position of the vehicle is consistent with a requested gear position; and when a mode switching clutch requests sliding friction, a gear position shifting clutch does not allow sliding friction; when the gear position shifting clutch requests sliding friction, the mode switching clutch does not allow sliding friction.

In one or more embodiments of the present application, the vehicle further satisfies the basic preset condition further including: an oil temperature of the clutch is within a preset temperature range; an opening degree of an accelerator pedal of the vehicle is within a preset opening range; a change rate of the accelerator pedal of the vehicle is within a preset pedal change rate range; an output shaft rotating speed of the clutch is within a preset rotating speed range; a change rate of the output shaft rotating speed of the clutch is within a preset rotating speed change rate range; an input shaft torque of the clutch is within a preset input shaft torque range; and an input shaft torque slope of the clutch is within a preset input shaft torque slope range.

In one or more embodiments of the present application, the third determining module is configured to determine to enter the deviation applying state if the current vehicle state satisfies following conditions: the clutch is not in a neutral state; and when entering the clutch torque deviation collecting state in a present adjustment period, the number of times of collecting torque deviation is greater than a preset number of times limit.

In a third aspect, the present application provides a computer storage medium, the computer storage medium stores computer-executable instructions which, when executed by a processor, implement the clutch control method according to the first aspect and any possible designs thereof.

In a fourth aspect, the present application provides computer program product, including a computer program which, when executed by a processor, implements the clutch control method according to the first aspect and any possible designs thereof.

The present application provides a clutch control method and apparatus, a computer storage medium and a computer program product, by the means of: determining whether a current vehicle state satisfies a condition for a clutch to enter a sliding friction state; if the condition for the clutch to enter the sliding friction state is satisfied, controlling the clutch to enter the sliding friction state, and determining a target sliding friction rotating speed, corresponding to a current gear position, of the clutch; then determining whether the current vehicle state satisfies a condition for entering a clutch torque deviation collecting state; if the condition for entering the clutch torque deviation collecting state is satisfied, collecting a torque deviation once, and storing the torque deviation; at an end of an adjustment period, accumulating all torque deviations collected previously and then taking an average value according to an accumulation number of times, so as to obtain an average torque deviation; if the average torque deviation exceeds a preset deviation threshold, recording the average torque deviation; and if the current vehicle state satisfies a condition for entering a deviation applying state, adjusting a current clutch friction coefficient according to the recorded average torque deviation, can realize automatic adjustment of the clutch friction coefficient, and thereby achieving accurate control of the clutch torque.

DESCRIPTION OF THE EMBODIMENTS

In order to make the objective, technical solution and advantage of embodiments of the present application more clear, the technical solution of the present application will be described clearly and completely below with reference to the accompanying drawings in the embodiments of the present application. Obviously, the described embodiments are only a part of embodiments of the present application, but not all of them. Based on the embodiments in the present application, all other embodiments obtained by those of ordinary skill in the art without creative efforts shall fall within the protection scope of the present application.

The control effect of the clutch has a great influence on the power, economy and smoothness of the vehicle. The clutch friction coefficient reflects a relationship between the clutch torque and the pressure, which plays an important role in realizing an automatic adjustment of the clutch friction coefficient and the accurate control of the clutch torque.

In order to achieve the above objective, embodiments of the present application provide the following technical solution: first determining whether a current vehicle state satisfies a condition for a clutch to enter a sliding friction state; if the condition for the clutch to enter the sliding friction state is satisfied, controlling the clutch to enter the sliding friction state, and determining a target sliding friction rotating speed, corresponding to a current gear position, of the clutch; then determining whether the current vehicle state satisfies a condition for entering a clutch torque deviation collecting state; if the condition for entering the clutch torque deviation collecting state is satisfied, collecting a torque deviation once, and storing the torque deviation; at an end of an adjustment period, accumulating all torque deviations collected previously and then taking an average value according to an accumulation number of times, so as to obtain an average torque deviation; if the average torque deviation exceeds a preset deviation threshold, recording the average torque deviation; and if the current vehicle state satisfies a condition for entering a deviation applying state, adjusting a current clutch friction coefficient according to the recorded average torque deviation, which can realize automatic adjustment of the clutch friction coefficient, and achieve the technical effect of accurate control of the clutch torque.

Figure 1:
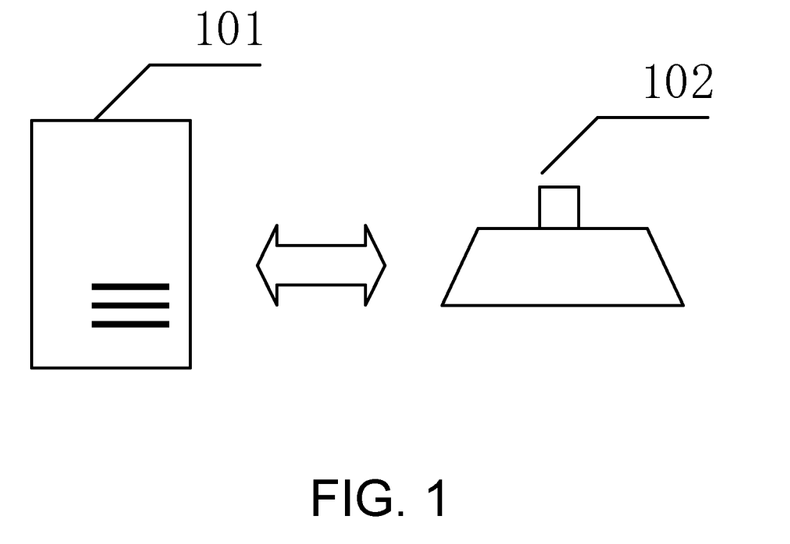
FIG. 1 is a schematic diagram of an application scenario of a clutch control method provided by an embodiment of the present application.

FIG. 1 is a schematic diagram of an application scenario of a clutch control method provided by an embodiment of the present application. As shown in FIG. 1, a controller 101 and a clutch 102 are provided. The controller 101 may be a transmission controller; the clutch 102 may be a clutch provided on AMT/DCT/DHT.

The clutch control method will be described below through detailed embodiments. It should be noted that the units involved in the embodiments of the present application are explained as follows: rotating speed: rpm; acceleration speed: m/s$^2$; torque unit: Nm; rotating speed change rate: rpm/s; torque slope: Nm/s.

Figure 2:
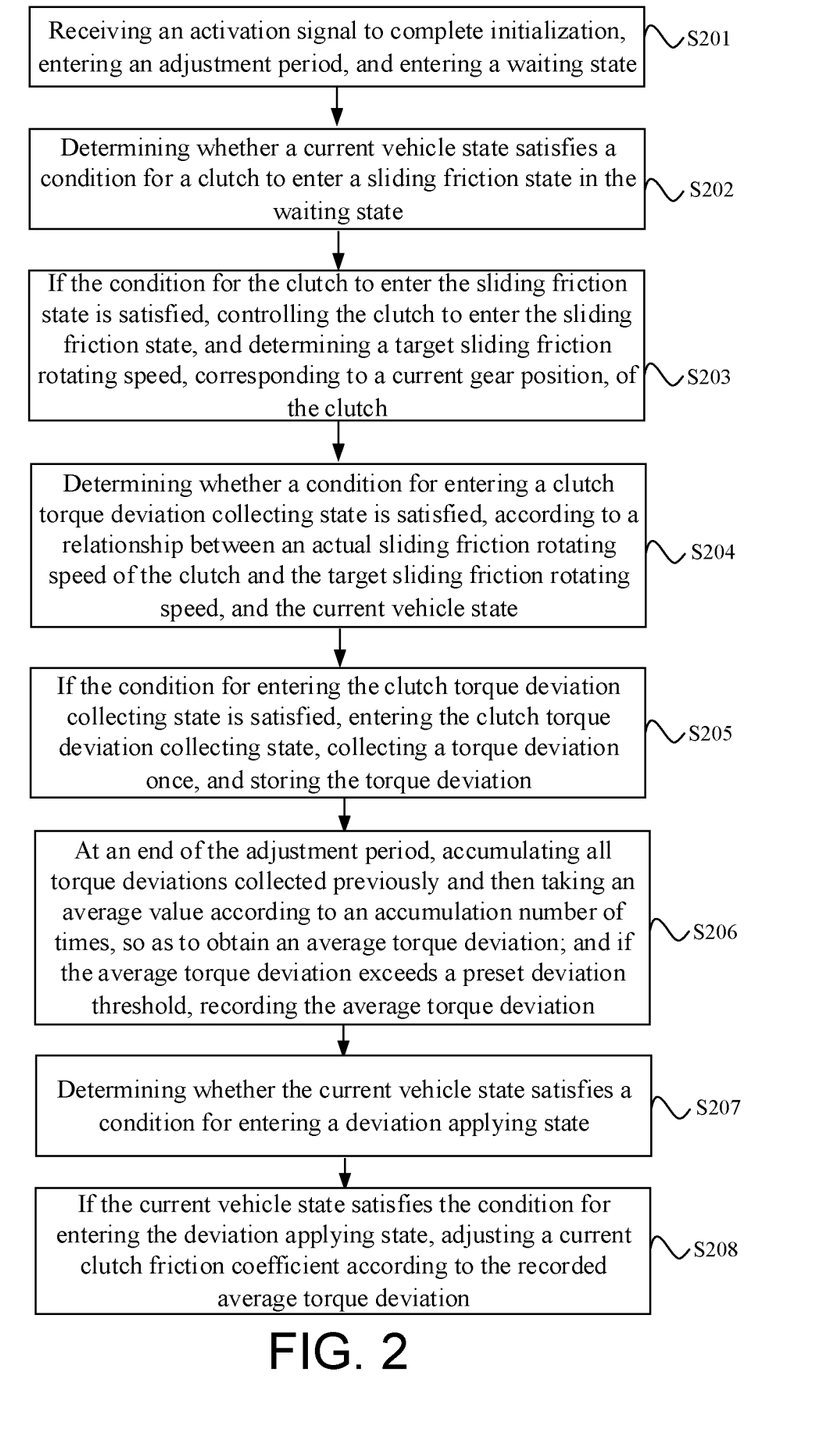
FIG. 2 is a schematic flowchart of a clutch control method provided by an embodiment of the present application.

FIG. 2 is a schematic flowchart of a clutch control method provided by an embodiment of the present application. The executive body of the present embodiment may be the controller in the embodiment illustrated in FIG. 1, and may specifically be a transmission controller, which is not particularly limited in the present embodiment. As shown in FIG. 2, the method includes:

S201, receiving an activation signal to complete initialization, entering an adjustment period, and entering a waiting state.

In the embodiment of the present application, when the transmission controller is activated, it automatically enters an initialization state, and after the initialization state is completed, it enters the waiting state.

S202, determining whether a current vehicle state satisfies a condition for a clutch to enter a sliding friction state in the waiting state.

In the embodiment of the present application, it is determined that the condition for the clutch to enter the sliding friction state is satisfied if the current vehicle state satisfies following conditions:

1) the actual sliding friction rotating speed of the clutch is within a preset rotating speed range, and an acceleration speed of the actual sliding friction rotating speed is within a preset acceleration speed range;

where the actual sliding friction rotating speed is within the preset rotating speed range [−30, 30], and the acceleration speed of the actual sliding friction rotating speed is within the preset acceleration speed range [−200, 200]; and 2) a vehicle satisfies a basic preset condition.

In the embodiment of the present application, it is determined that the condition for the clutch to enter the sliding friction state is satisfied if the current vehicle state further satisfies following conditions:

3) a number of times of an invalid sliding friction of the clutch is less than a preset number of times limit, where the invalid sliding friction refers to a sliding friction duration exceeding a preset duration threshold;

where the sliding friction duration exceeding 10 s is identified as the invalid sliding friction, and the preset number of times limit can be 255 times;

4) an absolute value of a second differential of an output shaft rotating speed is less than a threshold;

an adjustment period interval duration is within a preset duration;

where a duration between a previous adjustment period and a current adjustment period is an adjustment period interval, and the preset duration may be 1800 s;

6) an actual sliding friction duration of the clutch does not exceed a preset duration threshold;

where the preset duration threshold may be 10 s.

In an embodiment of the present application, the vehicle satisfy the basic preset conditions includes:

2.1) the clutch is not in a gear position shifting process;

2.2) the clutch is in an in-gear state;

2.3) a current mode of a vehicle is consistent with a requested mode; where the vehicle may be a hybrid vehicle in a pure electric mode, a parallel mode or a series mode;

2.4) the clutch does not overheat;

2.5) a current gear position of the vehicle is consistent with a requested gear position; and 2.6) when a mode switching clutch requests sliding friction, a gear position shifting clutch does not allow sliding friction; when the gear position shifting clutch requests sliding friction, the mode switching clutch does not allow sliding friction; where the gear position shifting clutch may be 3 gear position shifting clutches.

In another embodiment of the present application, the vehicle satisfies basic preset conditions further including:

2.7) an oil temperature of the clutch is within a preset temperature range; where the preset temperature range may be between 40° C. and 80° C.;

2.8) an opening degree of an accelerator pedal of the vehicle is within a preset opening range; where the preset opening degree range may be between 10% and 100%;

2.9) a change rate of the accelerator pedal of the vehicle is within a preset pedal change rate range; where the preset pedal change rate range may be that the change rate of the accelerator pedal is between −50%/s and 50%/s;

2.10) an output shaft rotating speed of the clutch is within a preset rotating speed range; where the preset rotating speed may be that the output shaft rotating speed is within a certain range of 450 to 3000;

2.11) a change rate of the output shaft rotating speed of the clutch is within a preset rotating speed change rate range; where the preset rotating speed change rate range may be that the change rate of the output shaft rotating speed is within a certain range of −200 to 200;

2.12) an input shaft torque of the clutch is within a preset input shaft torque range; where the preset input shaft torque range may be that the input shaft torque is within a certain range of 100 to 200; and 2.13) an input shaft torque slope of the clutch is within a preset input shaft torque slope range; where the preset input shaft torque slope range may be that the input shaft torque slope is within a certain range of −200 to 200.

S203, if the condition for the clutch to enter the sliding friction state is satisfied, controlling the clutch to enter the sliding friction state, and determining a target sliding friction rotating speed, corresponding to a current gear position, of the clutch.

In the embodiments of the present application, different units correspond to different target sliding friction rotating speeds.

S204, determining whether a condition for entering a clutch torque deviation collecting state is satisfied, according to a relationship between an actual sliding friction rotating speed of the clutch and the target sliding friction rotating speed, and the current vehicle state.

In the embodiment of the present application, it is determined that the condition for entering the clutch torque deviation collecting state is satisfied if the relationship between the actual sliding friction rotating speed of the clutch and the target sliding friction rotating speed, and the current vehicle state satisfy following conditions:
1) the actual sliding friction rotating speed of the clutch is within a range of the target sliding friction rotating speed; where the range of the target sliding friction rotating speed can be [−30, 70];
2) the acceleration speed of the actual sliding friction rotating speed of the clutch is within the preset acceleration speed range; where the preset acceleration speed range can be [−200, 200];
3) when entering the clutch torque deviation collecting state in a previous adjustment period, a number of times of collecting torque deviation is less than a preset number of times limit; where the preset number of times may be 100 times; and
4) a vehicle satisfies a basic preset condition;
where the basic preset condition is consistent with the relevant descriptions in step S202, and are not repeated here.

S205, if the condition for entering the clutch torque deviation collecting state is satisfied, entering the clutch torque deviation collecting state, collecting a torque deviation once, and storing the torque deviation.

Specifically, the torque deviation is obtained by substituting a clutch PI torque, a hysteresis torque and an input shaft torque into the following formula:
torque deviation=(clutch PI torque+hysteresis torque)/input shaft torque; where the clutch PI torque is a negative value, and the hysteresis torque refers to an exceeding value of a corresponding torque when the input shaft torque descends compared with a corresponding torque when the input shaft torque ascends at the same request pressure point. The input shaft torque is an input shaft torque of the clutch.

The clutch PI torque=clutch sliding friction P-term torque+clutch sliding friction I-term torque; where the clutch sliding friction P-term torque=(target sliding difference−actual sliding difference)*P-term coefficient; clutch sliding friction I-term torque=(target sliding difference−actual sliding difference)*cumulative sum of I-term coefficients. Here, the P-term coefficient is related to a difference of (target sliding difference−actual sliding difference) and the gear position, as shown in Table 1 below. The I-term coefficient is related to a difference of (target sliding difference−actual sliding difference) and the gear position, as shown in Table 2 below.

The hysteresis torque exists objectively and needs to be tested through the revolving drum test, which is related to the input shaft torque. The hysteresis torque refers to an exceeding value of a corresponding torque when the input shaft torque descends compared with a corresponding torque when the input shaft torque ascends at the same request pressure point.

For example, requesting a pressure of 5 bar when ascending, a corresponding clutch torque is 100 Nm; requesting a pressure of 5 bar when descending, a corresponding clutch torque is 150 Nm, then the hysteresis torque is 50 Nm when descending, and the hysteresis torque exists objectively. If the clutch torque of 150 Nm is requested when descending, if the friction coefficient is accurate, the deviation is 0; if the friction coefficient is too small, the calculated pressure is too large, the clutch is pressed more tightly, which is not easy to slip, and the sliding difference is not easy to achieve, the actual sliding difference is small and the PI torque is small, so the deviation is positive. If the friction coefficient is too large, then the calculated pressure is too small, the clutch cannot be pressed tightly, which is easier to slip, and the sliding difference is easy to achieve, the actual sliding difference is large, and the PI torque is too large, so the deviation is negative.

TABLE 1

P-item Coefficient Look-Up Table, x = target sliding difference − actual sliding difference, y is the current gear position.

| | y | | | |
|---|---|---|---|---|
| x | 0 | 1 | 2 | 3 |
| −200 | 0 | 0.12 | 0.12 | 0.12 |
| −100 | 0 | 0.18 | 0.18 | 0.18 |
| −50 | 0 | 0.22 | 0.22 | 0.22 |
| −20 | 0 | 0.3 | 0.3 | 0.3 |
| 0 | 0 | 1 | 1 | 1 |
| 20 | 0 | 0.3 | 0.3 | 0.3 |
| 50 | 0 | 0.22 | 0.22 | 0.22 |
| 100 | 0 | 0.18 | 0.18 | 0.18 |
| 200 | 0 | 0.12 | 0.12 | 0.12 |
| 300 | 0 | 0.1 | 0.1 | 0.1 |

TABLE 2

I-item Coefficient Look-Up Table, x = target sliding difference − actual sliding difference, y is the current gear position.

| | y | | | |
|---|---|---|---|---|
| x | 0 | 1 | 2 | 3 |
| −200 | 0 | 0.04 | 0.04 | 0.04 |
| −100 | 0 | 0.05 | 0.05 | 0.05 |
| −50 | 0 | 0.08 | 0.08 | 0.08 |
| −20 | 0 | 0.1 | 0.1 | 0.1 |
| 0 | 0 | 0.1 | 0.1 | 0.1 |
| 20 | 0 | 0.1 | 0.1 | 0.1 |
| 50 | 0 | 0.08 | 0.08 | 0.08 |
| 100 | 0 | 0.05 | 0.05 | 0.05 |
| 200 | 0 | 0.03 | 0.03 | 0.03 |
| 300 | 0 | 0.04 | 0.04 | 0.04 |

The hysteresis torque refers to an exceeding value of a corresponding torque when the input shaft torque descends compared with a corresponding torque when the input shaft torque ascends at the same request pressure point, which can be obtained through the hysteresis torque look-up table, as shown in Table 3.

TABLE 3

| Hysteresis Torque Look-Up Table | | | | | | | | |
|---|---|---|---|---|---|---|---|---|
| Input shaft torque | 0 | 50 | 80 | 100 | 150 | 250 | 300 | 350 |
| Clutch hysteresis torque at gear position 1 | 0 | 18.75 | 20.25 | 19.69512 | 13.5 | 4.5 | 0 | 0 |

TABLE 3-continued

Hysteresis Torque Look-Up Table

| Input shaft torque | 0 | 50 | 80 | 100 | 150 | 250 | 300 | 350 |
|---|---|---|---|---|---|---|---|---|
| Clutch hysteresis torque at gear position 2 | 0 | 29.01381 | 29.01381 | 29.98577 | 25.82229 | 21.61529 | 13.05621 | 13.05621 |

| Input shaft torque | 0 | 50 | 150 | 200 | 250 | 300 | 350 | 400 |
|---|---|---|---|---|---|---|---|---|
| Clutch hysteresis torque at gear position 3 | 0 | 4.5 | 4.5 | 4.5 | 4.5 | 4.5 | 4.5 | 4.5 |

| Input shaft torque | 0 | 50 | 100 | 150 | 200 | 250 | 300 | 350 |
|---|---|---|---|---|---|---|---|---|
| Clutch hysteresis torque at C0 | 25 | 25 | 20 | 15 | 15 | 10 | 7 | 7 |

S206, at an end of the adjustment period, accumulating all torque deviations collected previously and then taking an average value according to an accumulation number of times, so as to obtain an average torque deviation; and if the average torque deviation exceeds a preset deviation threshold, recording the average torque deviation.

In the embodiment of the present application, average torque deviation=accumulation of all torque deviations/accumulation number of times in a period.

It should be noted that a maximum limit and a minimum limit of the average torque deviation can also be set, and the maximum and minimum limits are taken when a value exceeds the maximum and minimum limits. For example, the maximum and minimum limits are −3% and 3%.

S207, determining whether the current vehicle state satisfies a condition for entering a deviation applying state.

Specifically, it is determined to enter the deviation applying state if the current vehicle state satisfies following conditions:

1) the clutch is not in a neutral state; and
2) when entering the clutch torque deviation collecting state in a present adjustment period, the number of times of collecting torque deviation is greater than a preset number of times limit. The preset number of times limit can take a value of 100 times.

S208, if the current vehicle state satisfies the condition for entering the deviation applying state, adjusting a current clutch friction coefficient according to the recorded average torque deviation.

In an embodiment of the present application, the adjusting the current clutch friction coefficient according to the recorded average torque deviation includes: determining a total deviation according to the average torque deviation and a previous deviation; if the total deviation is a negative value, adjusting and reducing the clutch friction coefficient according to a preset conversion coefficient; and if the total deviation is a positive value, adjusting and increasing the clutch friction coefficient according to the preset conversion coefficient.

The total deviation is limited by a maximum value and a minimum value, and the maximum value and the minimum value are −30% and 30% respectively.

In an embodiment of the present application, if the current vehicle state satisfies the condition for entering the deviation applying state, after the adjusting the current clutch friction coefficient according to the recorded average torque deviation, the method further includes: entering a clearing state to clear all torque deviation data collected in the present adjustment period.

As can be seen from the above description, by the means of: determining whether a current vehicle state satisfies a condition for a clutch to enter a sliding friction state; if the condition for the clutch to enter the sliding friction state is satisfied, controlling the clutch to enter the sliding friction state, and determining a target sliding friction rotating speed, corresponding to a current gear position, of the clutch; then determining whether the current vehicle state satisfies a condition for entering a clutch torque deviation collecting state; if the condition for entering the clutch torque deviation collecting state is satisfied, collecting a torque deviation once, and storing the torque deviation; at an end of an adjustment period, accumulating all torque deviations collected previously and then taking an average value according to an accumulation number of times, so as to obtain an average torque deviation; if the average torque deviation exceeds a preset deviation threshold, recording the average torque deviation; and if the current vehicle state satisfies a condition for entering a deviation applying state, adjusting a current clutch friction coefficient according to the recorded average torque deviation, the automatic adjustment of the clutch friction coefficient can be realized, and thereby achieve the technical effect of accurate control of the clutch torque.

Figure 3:
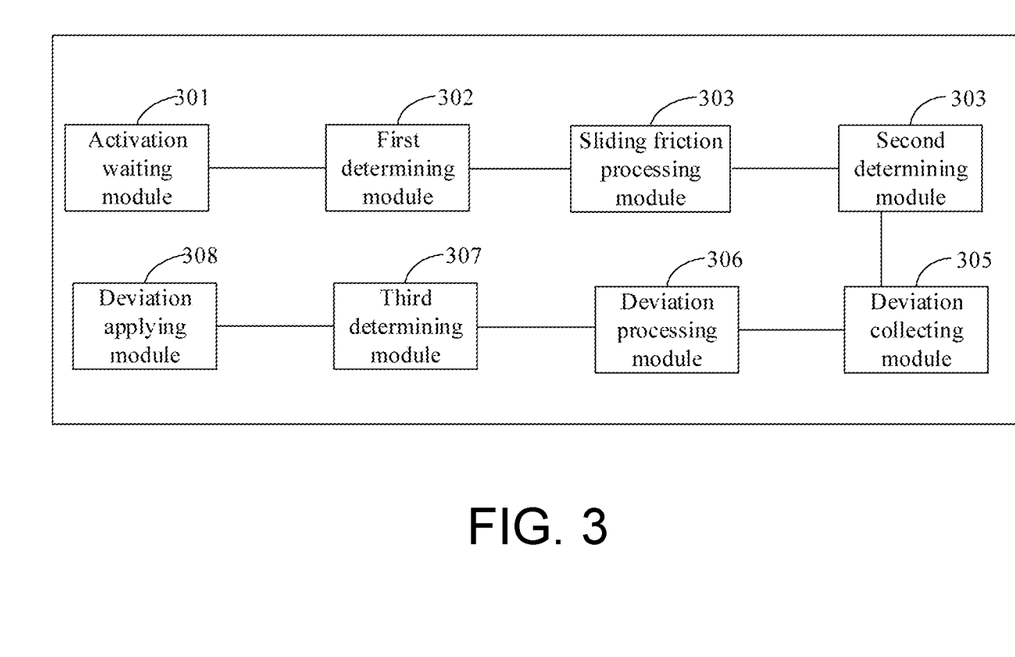
FIG. 3 is a schematic structural diagram of a control apparatus provided by an embodiment of the present application.

FIG. 3 is a schematic structural diagram of a control apparatus provided by an embodiment of the present application. As shown in FIG. 3, the control apparatus, capable of controlling the clutch, includes: an activation waiting module 301, a first determining module 302, a sliding friction processing module 303, a second determining module 304, a deviation collecting module 305, a deviation processing module 306, a third determining module 307 and a deviation applying module 308.

The activation waiting module 301 is configured to receive an activation signal to complete initialization, enter an adjustment period, and enter a waiting state;

the first determining module 302 is configured to determine whether a current vehicle state satisfies a condition for a clutch to enter a sliding friction state in the waiting state;

the sliding friction processing module 303 is configured to control the clutch to enter the sliding friction state if the condition for the clutch to enter the sliding friction state is satisfied, and determine a target sliding friction rotating speed, corresponding to a current gear position, of the clutch;

the second determining module 304 is configured to determine whether a condition for entering a clutch torque deviation collecting state is satisfied, according to a relationship between an actual sliding friction rotating speed of the clutch and the target sliding friction rotating speed, and the current vehicle state;

the deviation collecting module 305 is configured to enter the clutch torque deviation collecting state if the condition for entering the clutch torque deviation collecting state is satisfied, collect a torque deviation once, and store the torque deviation;

the deviation processing module 306 is configured to accumulate all torque deviations collected previously at an end of the adjustment period and then take an average value according to an accumulation number of times, so as to obtain an average torque deviation; and if the average torque deviation exceeds a preset deviation threshold, record the average torque deviation;

the third determining module 307 is configured to determine whether the current vehicle state satisfies a condition for entering a deviation applying state; and the deviation applying module 308 is configured to adjust a current clutch friction coefficient according to the recorded average torque deviation if the current vehicle state satisfies the condition for entering the deviation applying state.

As can be seen from the above description, by the means of: determining whether a current vehicle state satisfies a condition for a clutch to enter a sliding friction state; if the condition for the clutch to enter the sliding friction state is satisfied, controlling the clutch to enter the sliding friction state, and determining a target sliding friction rotating speed, corresponding to a current gear position, of the clutch; then determining whether the current vehicle state satisfies a condition for entering a clutch torque deviation collecting state; if the condition for entering the clutch torque deviation collecting state is satisfied, collecting a torque deviation once, and storing the torque deviation; at an end of an adjustment period, accumulating all torque deviations collected previously and then taking an average value according to an accumulation number of times, so as to obtain an average torque deviation; if the average torque deviation exceeds a preset deviation threshold, recording the average torque deviation; and if the current vehicle state satisfies a condition for entering a deviation applying state, adjusting a current clutch friction coefficient according to the recorded average torque deviation, the automatic adjustment of the clutch friction coefficient can be realized, and thereby achieve the technical effect of accurate control of the clutch torque.

In a possible implementation, the first determining module 302 is configured to determine that the condition for the clutch to enter the sliding friction state is satisfied if the current vehicle state satisfies following conditions:

the actual sliding friction rotating speed of the clutch is within a preset rotating speed range, and an acceleration speed of the actual sliding friction rotating speed is within a preset acceleration speed range;

a number of times of an invalid sliding friction of the clutch is less than a preset number of times limit, where the invalid sliding friction refers to a sliding friction duration exceeding a preset duration threshold;

an absolute value of a second differential of an output shaft rotating speed is less than a threshold;

an adjustment period interval duration is within a preset duration;

an actual sliding friction duration of the clutch does not exceed a preset duration threshold; and a vehicle satisfies a basic preset condition.

In a possible implementation, the vehicle satisfy the basic preset conditions includes:

the clutch is not in a gear position shifting process;

the clutch is in an in-gear state;

an oil temperature of the clutch is within a preset temperature range;

an opening degree of an accelerator pedal of the vehicle is within a preset opening range.

a change rate of the accelerator pedal of the vehicle is within a preset pedal change rate range;

a current mode of a vehicle is consistent with a requested mode;

an output shaft rotating speed of the clutch is within a preset rotating speed range;

a change rate of the output shaft rotating speed of the clutch is within a preset rotating speed change rate range;

the clutch does not overheat;

a current gear position of the vehicle is consistent with a requested gear position;

when a mode switching clutch requests sliding friction, a gear position shifting clutch does not allow sliding friction; when the gear position shifting clutch requests sliding friction, the mode switching clutch does not allow sliding friction;

an input shaft torque of the clutch is within a preset input shaft torque range; and an input shaft torque slope of the clutch is within a preset input shaft torque slope range.

In a possible implementation, the second determining module 304 is configured to determine that the condition for entering the clutch torque deviation collecting state is satisfied if the relationship between the actual sliding friction rotating speed of the clutch and the target sliding friction rotating speed, and the current vehicle state satisfy following conditions:

the actual sliding friction rotating speed of the clutch is within a range of the target sliding friction rotating speed;

the acceleration speed of the actual sliding friction rotating speed of the clutch is within a preset acceleration speed range;

when entering the clutch torque deviation collecting state in a previous adjustment period, a number of times of collecting torque deviation is less than a preset number of times limit; and the vehicle satisfies the basic preset condition.

The third determining module 307 is configured to determine to enter the deviation applying state if the current vehicle state satisfies following conditions:

the clutch is not in a neutral state; and when entering the clutch torque deviation collecting state in a present adjustment period, the number of times of collecting torque deviation is greater than a preset number of times limit.

The apparatus provided in the present embodiment can be used to implement the technical solutions of the foregoing method embodiments, and the implementation principles and technical effects thereof are similar, and details are not described herein again in the present embodiment.

Figure 4:
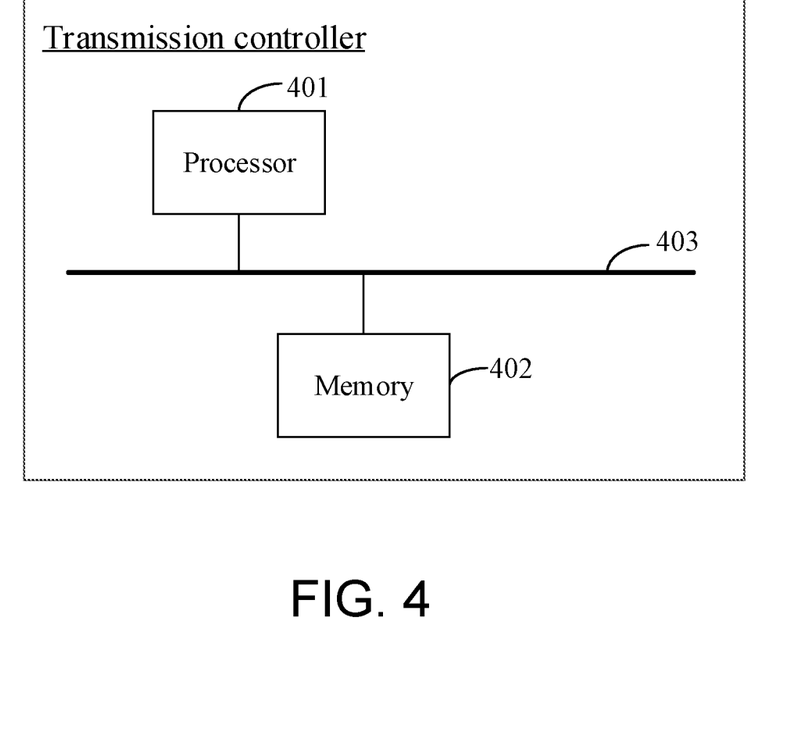
FIG. 4 is a schematic diagram of a hardware structure of a transmission controller provided by an embodiment of the present application.

FIG. 4 is a schematic diagram of a hardware structure of a transmission controller provided by an embodiment of the present application. As shown in FIG. 4, the transmission controller 40 of the present embodiment includes: a processor 401 and a memory 402; where the memory 402 is configured to store computer-executed instructions;

the processor 401 is configured to execute computer-executed instructions stored in the memory, so as to implement various steps executed by a server in foregoing embodiments. For details, refer to the relevant descriptions in the foregoing method embodiments.

In an implementation, the memory 402 may be independent or integrated with the processor 401.

When the memory 402 is set independently, the transmission controller further includes a bus 403 for connecting the memory 402 and the processor 401.

Embodiments of the present application also provide a computer storage medium, where computer-executable instructions are stored in the computer storage medium, and when a processor executes the computer-executable instructions, the above clutch control methods are implemented.

Embodiments of the present application also provide a computer program product, including a computer program, which, when executed by a processor, implements the above clutch control method.

In the several embodiments provided in the present application, it should be understood that the disclosed device and method may be implemented in other manners. For example, the device embodiments described above are only illustrative. For example, the division of the modules is only a logical function division. In actual implementation, there may be other division methods. For example, multiple modules may be combined or be integrated to another system, or some features can be ignored, or not be implemented. On the other hand, the shown or discussed mutual coupling or direct coupling or communication connection may be indirect coupling or communication connection through some interfaces, apparatuses or modules, and may be in electrical, mechanical or other forms.

The modules described as separate components may or may not be physically separated, and components shown as modules may or may not be physical units, that is, may be located in one place, or may be distributed to multiple network units. Some or all of the modules may be selected according to actual needs to implement the solution of the present embodiment.

In addition, each functional module in each embodiment of the present application may be integrated into one processing unit, or each module may exist physically alone, or two or more modules may be integrated into one unit. The units formed by the above modules can be implemented in the form of hardware, or can be implemented in the form of hardware plus software functional units.

The above-mentioned integrated modules implemented in the form of software functional modules may be stored in a computer-readable storage medium. The above-mentioned software function modules are stored in a storage medium, and include several instructions to cause a computer device (which may be a personal computer, a server, or a network device, etc.) or a processor to execute some steps of the methods described in the various embodiments of the present application.

It should be understood that the above-mentioned processor may be a central processing unit (CPU), or other general-purpose processors, a digital signal processor (DSP), an application specific integrated circuit (ASIC) and so on. A general purpose processor may be a microprocessor or the processor may be any conventional processor or the like. The steps of the method disclosed in conjunction with the present application can be directly embodied as executed by a hardware processor, or executed by a combination of hardware and software modules in the processor.

The memory may include a high-speed random access memory (RAM) memory, and may also include a non-volatile storage (NVM), such as at least one magnetic disk memory, and may also be a U disk, a removable hard disk, a read-only memory, a magnetic disk or an optical disk, and the like.

The bus may be an industry standard architecture (ISA) bus, a peripheral component interconnect (PCI) bus, an extended industry standard architecture (EISA) bus, or the like. The bus can be divided into address bus, data bus, control bus and so on. For convenience of representation, the buses in the drawings of the present application are not limited to only one bus or one type of bus.

The above-mentioned storage medium may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk. A storage medium can be any available medium that can be accessed by a general purpose or special purpose computer.

An exemplary storage medium is coupled to a processor, so as to enable the processor to read information therefrom, and to write information thereto, the storage medium. Of course, the storage medium can also be an integral part of the processor. The processor and the storage medium may be located in an application specific integrated circuit (ASIC). Of course, the processor and the storage medium may also exist in the electronic device or the host device as discrete components.

Those of ordinary skill in the art can understand that all or part of the steps of implementing the above method embodiments may be completed by program instructions related hardware. The aforementioned program can be stored in a computer-readable storage medium. When the program is executed, the steps including the above method embodiments are executed; and the aforementioned storage medium includes: ROM, RAM, magnetic disk or optical disk and other media that can store program codes.

Finally, it should be noted that the above embodiments are only used to illustrate the technical solutions of the present application, but are not to limit them; although the present application has been described in detail with reference to the foregoing embodiments, those of ordinary skill in the art should understand that: the technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present application.

What is claimed is:

1. A clutch control method, comprising:
receiving an activation signal to complete initialization, entering an adjustment period, and entering a waiting state;
determining whether a current vehicle state satisfies a condition for a clutch to enter a sliding friction state in the waiting state;
if the condition for the clutch to enter the sliding friction state is satisfied, controlling the clutch to enter the sliding friction state, and determining a target sliding friction rotating speed, corresponding to a current gear position, of the clutch;
determining whether a condition for entering a clutch torque deviation collecting state is satisfied, according to a relationship between an actual sliding friction rotating speed of the clutch and the target sliding friction rotating speed, and the current vehicle state;
if the condition for entering the clutch torque deviation collecting state is satisfied, entering the clutch torque deviation collecting state, collecting a torque deviation once, and storing the torque deviation;
at an end of the adjustment period, accumulating all torque deviations collected previously and then taking an average value according to an accumulation number of times, so as to obtain an average torque deviation; and if the average torque deviation exceeds a preset deviation threshold, recording the average torque deviation;
determining whether the current vehicle state satisfies a condition for entering a deviation applying state; and
if the current vehicle state satisfies the condition for entering the deviation applying state, adjusting a current clutch friction coefficient according to the recorded average torque deviation.

2. The method according to claim 1, wherein it is determined that the condition for the clutch to enter the sliding friction state is satisfied if the current vehicle state satisfies following conditions:
the actual sliding friction rotating speed of the clutch is within a preset rotating speed range, and an acceleration speed of the actual sliding friction rotating speed is within a preset acceleration speed range; and
a vehicle satisfies a basic preset condition.

3. The method according to claim 2, wherein it is determined that the condition for the clutch to enter the sliding friction state is satisfied if the current vehicle state further satisfies following conditions:
a number of times of an invalid sliding friction of the clutch is less than a preset number of times limit, wherein the invalid sliding friction refers to a sliding friction duration exceeding a preset duration threshold;
an absolute value of a second differential of an output shaft rotating speed is less than a threshold;
an adjustment period interval duration is within a preset duration; and
an actual sliding friction duration of the clutch does not exceed a preset duration threshold.

4. The method according to claim 2, wherein the vehicle satisfies the basic preset condition comprising:
the clutch is not in a gear position shifting process;
the clutch is in an in-gear state;
a current mode of the vehicle is consistent with a requested mode;
the clutch does not overheat;
the current gear position of the vehicle is consistent with a requested gear position; and
when a mode switching clutch requests sliding friction, a gear position shifting clutch does not allow sliding friction; when the gear position shifting clutch requests sliding friction, the mode switching clutch does not allow sliding friction.

5. The method according to claim 4, wherein the vehicle satisfies the basic preset condition further comprising:
an oil temperature of the clutch is within a preset temperature range;
an opening degree of an accelerator pedal of the vehicle is within a preset opening range;
a change rate of the accelerator pedal of the vehicle is within a preset pedal change rate range;
an output shaft rotating speed of the clutch is within a preset rotating speed range;
a change rate of the output shaft rotating speed of the clutch is within a preset rotating speed change rate range;
an input shaft torque of the clutch is within a preset input shaft torque range; and
an input shaft torque slope of the clutch is within a preset input shaft torque slope range.

6. The method according to claim 1, wherein the determining whether the condition for entering the clutch torque deviation collecting state is satisfied, according to the relationship between the actual sliding friction rotating speed of the clutch and the target sliding friction rotating speed, and the current vehicle state comprises:
determining that the condition for entering the clutch torque deviation collecting state is satisfied if the relationship between the actual sliding friction rotating speed of the clutch and the target sliding friction rotating speed, and the current vehicle state satisfy following conditions:
the actual sliding friction rotating speed of the clutch is within a range of the target sliding friction rotating speed;
an acceleration speed of the actual sliding friction rotating speed of the clutch is within a preset acceleration speed range;
when entering the clutch torque deviation collecting state in a previous adjustment period, a number of times of collecting torque deviation is less than a preset number of times limit; and
a vehicle satisfies a basic preset condition.

7. The method according to claim 1, wherein the determining whether the current vehicle state satisfies the condition for entering the deviation applying state comprises:
determining to enter the deviation applying state if the current vehicle state satisfies following conditions:
the clutch is not in a neutral state; and
when entering the clutch torque deviation collecting state in a present adjustment period, a number of times of collecting torque deviation is greater than a preset number of times limit.

8. The method according to claim 7, wherein if the current vehicle state satisfies the condition for entering the deviation applying state, after the adjusting the current clutch friction coefficient according to the recorded average torque deviation, further comprising:
entering a clearing state to clear all torque deviation data collected in the present adjustment period.

9. The method according to claim 7, wherein entering the clutch torque deviation collecting state and collecting the torque deviation once comprises:

obtaining the torque deviation by substituting a clutch proportional-integral torque, a hysteresis torque and an input shaft torque into following formula:

torque deviation=(clutch proportional-integral torque+hysteresis torque)/input shaft torque;

wherein the clutch proportional-integral torque is a negative value, and the hysteresis torque refers to an exceeding value of a corresponding torque when the input shaft torque descends compared with a corresponding torque when the input shaft torque ascends at a same request pressure point;

the input shaft torque is an input shaft torque of the clutch.

10. The method according to claim 9, wherein the clutch proportional-integral torque=clutch sliding friction P-term torque+clutch sliding friction I-term torque; wherein the clutch sliding friction P-term torque=(target sliding difference−actual sliding difference)*P-term coefficient; clutch sliding friction I-term torque=(target sliding difference−actual sliding difference)*cumulative sum of I-term coefficients.

11. The method according to claim 1, wherein adjusting the current clutch friction coefficient according to the recorded average torque deviation comprises:
determining a total deviation according to the average torque deviation and a previous deviation;
if the total deviation is a negative value, adjusting and reducing the clutch friction coefficient according to a preset conversion coefficient; and
if the total deviation is a positive value, adjusting and increasing the clutch friction coefficient according to the preset conversion coefficient.

12. The method according to claim 11, wherein the total deviation is limited by a maximum value and a minimum value, and the maximum value and the minimum value are −30% and 30% respectively.

13. A control apparatus capable of controlling a clutch, comprising:
a processor; and
a memory, configured to store a computer program of the processor;
wherein the processor, by executing the computer program, is configured to:
receive an activation signal to complete initialization, enter an adjustment period, and enter a waiting state;
determine whether a current vehicle state satisfies a condition for the clutch to enter a sliding friction state in the waiting state;
control the clutch to enter the sliding friction state if the condition for the clutch to enter the sliding friction state is satisfied, and determine a target sliding friction rotating speed, corresponding to a current gear position, of the clutch;
determine whether a condition for entering a clutch torque deviation collecting state is satisfied, according to a relationship between an actual sliding friction rotating speed of the clutch and the target sliding friction rotating speed, and the current vehicle state;
enter the clutch torque deviation collecting state if the condition for entering the clutch torque deviation collecting state is satisfied, collect a torque deviation once, and store the torque deviation;
accumulate all torque deviations collected previously at an end of the adjustment period and then take an average value according to an accumulation number of times, so as to obtain an average torque deviation; and if the average torque deviation exceeds a preset deviation threshold, record the average torque deviation;
determine whether the current vehicle state satisfies a condition for entering a deviation applying state; and
adjust a current clutch friction coefficient according to the recorded average torque deviation if the current vehicle state satisfies the condition for entering the deviation applying state.

14. The control apparatus according to claim 13, wherein the processor is configured to determine that the condition for the clutch to enter the sliding friction state is satisfied if the current vehicle state satisfies following conditions:
the actual sliding friction rotating speed of the clutch is within a preset rotating speed range, and an acceleration speed of the actual sliding friction rotating speed is within a preset acceleration speed range;
a number of times of an invalid sliding friction of the clutch is less than a preset number of times limit, wherein the invalid sliding friction refers to a sliding friction duration exceeding a preset duration threshold;
an absolute value of a second differential of an output shaft rotating speed is less than a threshold;
an adjustment period interval duration is within a preset duration;
an actual sliding friction duration of the clutch does not exceed a preset duration threshold; and
a vehicle satisfies a basic preset condition.

15. The control apparatus according to claim 14, wherein the processor is configured to determine that the condition for entering the clutch torque deviation collecting state is satisfied if the relationship between the actual sliding friction rotating speed of the clutch and the target sliding friction rotating speed, and the current vehicle state satisfy following conditions: the actual sliding friction rotating speed of the clutch is within a range of the target sliding friction rotating speed; the acceleration speed of the actual sliding friction rotating speed of the clutch is within the preset acceleration speed range; when entering the clutch torque deviation collecting state in a previous adjustment period, a number of times of collecting torque deviation is less than a preset number of times limit; and the vehicle satisfies the basic preset condition.

16. The control apparatus according to claim 14, wherein the vehicle satisfies the basic preset condition comprising:
the clutch is not in a gear position shifting process;
the clutch is in an in-gear state;
a current mode of the vehicle is consistent with a requested mode;
the clutch does not overheat;
the current gear position of the vehicle is consistent with a requested gear position; and
when a mode switching clutch requests sliding friction, a gear position shifting clutch does not allow sliding friction; when the gear position shifting clutch requests sliding friction, the mode switching clutch does not allow sliding friction.

17. The control apparatus according to claim 16, wherein the vehicle satisfies the basic preset condition further comprising:
an oil temperature of the clutch is within a preset temperature range;
an opening degree of an accelerator pedal of the vehicle is within a preset opening range;
a change rate of the accelerator pedal of the vehicle is within a preset pedal change rate range;
an output shaft rotating speed of the clutch is within a preset rotating speed range;

a change rate of the output shaft rotating speed of the clutch is within a preset rotating speed change rate range;

an input shaft torque of the clutch is within a preset input shaft torque range; and an input shaft torque slope of the clutch is within a preset input shaft torque slope range.

18. The control apparatus according to claim 13, wherein the processor is configured to determine to enter the deviation applying state if the current vehicle state satisfies following conditions:

the clutch is not in a neutral state; and when entering the clutch torque deviation collecting state in a present adjustment period, a number of times of collecting torque deviation is greater than a preset number of times limit.

19. The control apparatus according to claim 13, wherein the processor is configured to:

determine a total deviation according to the average torque deviation and a previous deviation;

if the total deviation is a negative value, adjust and reduce the clutch friction coefficient according to a preset conversion coefficient; and if the total deviation is a positive value, adjust and increase the clutch friction coefficient according to the preset conversion coefficient.

20. A non-transitory computer storage medium, wherein the computer storage medium stores computer-executable instructions, a processor, when executing the computer-executable instructions, is configured to:

receive an activation signal to complete initialization, enter an adjustment period, and enter a waiting state;

determine whether a current vehicle state satisfies a condition for a clutch to enter a sliding friction state in the waiting state;

control the clutch to enter the sliding friction state if the condition for the clutch to enter the sliding friction state is satisfied, and determine a target sliding friction rotating speed, corresponding to a current gear position, of the clutch;

determine whether a condition for entering a clutch torque deviation collecting state is satisfied, according to a relationship between an actual sliding friction rotating speed of the clutch and the target sliding friction rotating speed, and the current vehicle state;

enter the clutch torque deviation collecting state if the condition for entering the clutch torque deviation collecting state is satisfied, collect a torque deviation once, and store the torque deviation;

accumulate all torque deviations collected previously at an end of the adjustment period and then take an average value according to an accumulation number of times, so as to obtain an average torque deviation; and if the average torque deviation exceeds a preset deviation threshold, record the average torque deviation;

determine whether the current vehicle state satisfies a condition for entering a deviation applying state; and adjust a current clutch friction coefficient according to the recorded average torque deviation if the current vehicle state satisfies the condition for entering the deviation applying state.

\* \* \* \* \*